United States Patent [19]

Cinquino

[11] 4,143,249

[45] Mar. 6, 1979

[54] REAR DECK MOUNTING ADAPTER FOR CAR SPEAKER

[75] Inventor: Michael J. Cinquino, North Miami Beach, Fla.

[73] Assignee: Richard S. First, North Miami Beach, Fla. ; a part interest

[21] Appl. No.: 899,316

[22] Filed: Apr. 24, 1978

[51] Int. Cl.² .......................... H04R 1/28; H04M 1/04

[52] U.S. Cl. ............................ 179/146 E; 179/1 VE; 181/159; 312/242

[58] Field of Search .................... 312/242, 7 R, 7 TV; 179/1 VE, 146 E, 179; 181/159, 171, 192, 141

[56] References Cited

U.S. PATENT DOCUMENTS

| | | | |
|---|---|---|---|
| 2,186,276 | 1/1940 | Schwarz et al. | 181/150 |
| 2,550,336 | 4/1951 | Daniel | 179/179 |
| 2,795,639 | 6/1957 | Rawson | 312/242 |
| 3,043,912 | 7/1962 | Delaney | 179/1 VE |
| 3,135,349 | 6/1964 | Lahti | 179/146 E |
| 4,085,289 | 4/1978 | Schmideler | 179/1 VE |

*Primary Examiner*—Victor N. Sakran
*Attorney, Agent, or Firm*—Oltman and Flynn

[57] ABSTRACT

The present adapter is an annular body with a top flange of very pronounced oblong configuration to match the usual oblong speaker opening in the rear deck of a car between the rear seat and rear window. The adapter tapers down to a bottom flange of more nearly circular configuration, for supporting a speaker of similar configuration spaced below the rear deck.

3 Claims, 3 Drawing Figures

REAR DECK MOUNTING ADAPTER FOR CAR SPEAKER

BACKGROUND OF THE INVENTION

Factory-installed auto radios or tape players often come with rear speakers which are suspended from the deck or shelf which extends behind the top of the rear seat of the car to the bottom of its rear window. In such cases the rear deck installed at the auto factory has an oblong speaker opening. Because the space immediately below the rear deck is very restricted longitudinally of the car it has been necessary to provide a speaker opening which is so oblong that the sound quality if impaired. Heretofore the shape of the speaker opening in the car's rear deck has dictated the shape of the speaker itself. For example, in current General Motors cars the speaker opening in the rear deck is about 4 inches (from front-to-back) by 10 inches (from side-to-side), and a speaker with those proportions has relatively poor sound quality.

SUMMARY OF THE INVENTION

The present invention is directed to a novel speaker mounting adapter for attachment to the car's rear deck at the usual very oblong speaker opening. The present adapter takes advantage of the fact that the front-to-back clearance a short distance below the rear deck increases enough to accommodate a speaker of less oblong configuration (i.e., with a diameter longitudinally of the car which is more nearly as large as its diameter laterally of the car). In accordance with this invention, the adapter has a top flange whose oblong configuration matches that of the factory-installed opening in the car's rear deck and a bottom flange of less oblong, more nearly circular configuratin to which a speaker with the corresponding cross-sectional shape may be attached. The vertical depth of the adapter between its top and bottom flanges is enough to position the speaker far enough below the car's rear deck that there will be adequate room to receive it (particularly in the front-to-back direction).

A principal object of this invention is to provide a novel adapter for mounting a speaker below the deck behind the rear seat of an automobile.

Another object of this invention is to provide such an adapter which enables the use of a speaker of less oblong configuration, and therefore better sound quality, than was possible heretofore at the rear deck of automobiles.

Further objects and advantages of this invention will be apparent from the following detailed description of a presently-preferred embodiment, shown in the accompanying drawing in which.

Figure 1:
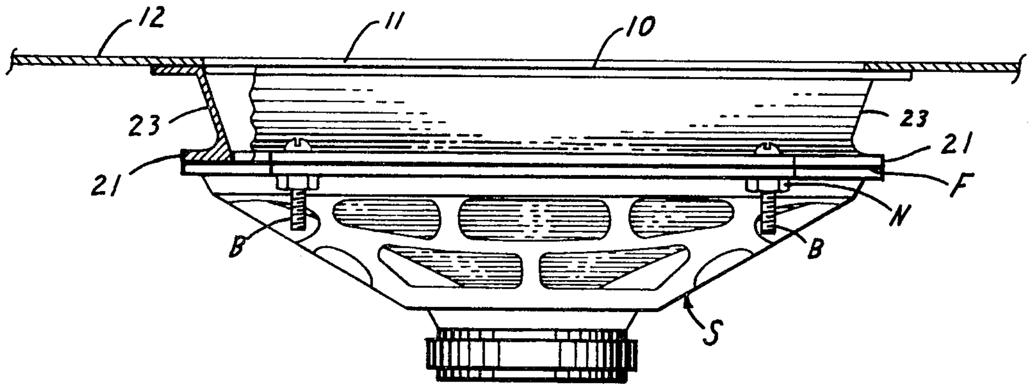
FIG. 1 is a vertical elevational view of the present adapter and the speaker which it supports, mounted below the rear deck of an automobile.

Before explaining the disclosed embodiment of the invention in detail, it is to be understood that the invention is not limited in its application to the details of the particular arrangement shown but is capable of other embodiments. Also, the terminology used herein is for the purpose of description and not of limitation.

Referring to the drawings, the mounting adapter of the present invention is a rigid annular body having a horizontal top flange 10 of pronounced oblong configuration corresponding to that of the speaker opening 11 formed at the factory in the rear deck 12 of the car. In the particular example shown in FIG. 2, the top flange has elongated, oppositely bowed front and back segments 13 and 14, which extend from side-to-side in the car. At its left end the top flange has an end segment 15, which is inclined laterally outward and forward from the back segment 14, and an end segment 16, which is inclined laterally outward and rearward from the front segment 13 and is joined at its inner end to the inner end of the end segment 15. Similar inclined end segments 17 and 18 are provided at the right end of the top flange 10 of this adapter.

Figure 2:
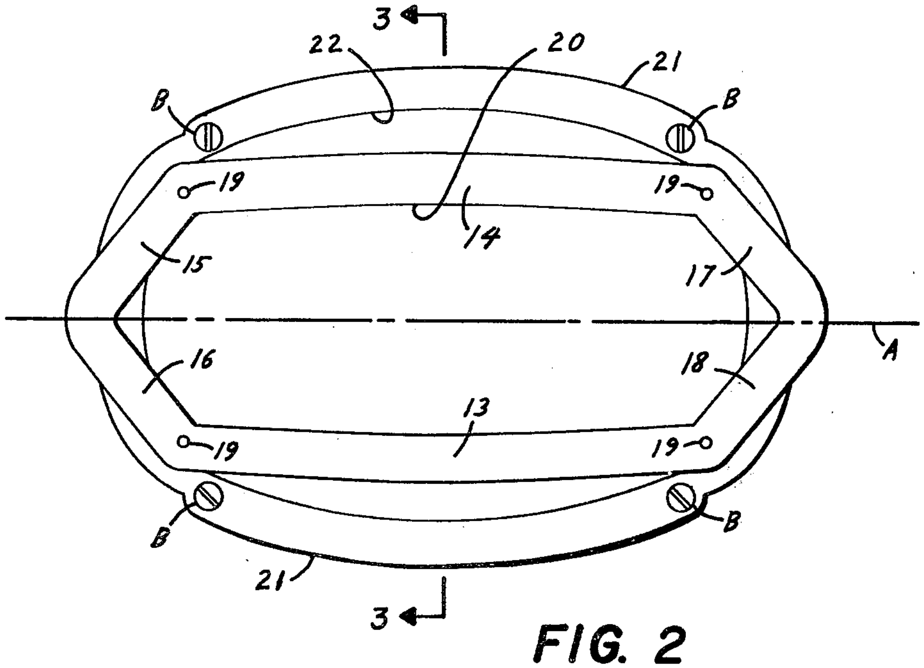
FIG. 2 is a top plan view of this adapter.

The line A in FIG. 2 represents the major axis of the oblong speaker opening 11 in the car's rear seat deck 12. This major axis extends through the juncture between the left end segments 15, 16 and the juncture between the right end segments 17, 18 at the top flange 10 of the present adapter. The front and back segments 13 and 14 of this flange are equidistant from axis A.

The top flange is formed with openings 19 at the opposite ends of its front and back segments 13 and 14 for receiving mounting screws or similar fasteners which attach it to the rear seat deck 12.

The complete top flange 10 extends around an oblong opening 20 which preferably matches (or substantially matches) the speaker opening 11 in the rear deck of the car.

The present adapter also has an annular, horizontal bottom flange 21 which is of less oblong, more nearly circular configuration than the top flange 10, as best seen in FIG. 2. In the particular example shown the bottom flange 21 defines an elliptical opening 22 with a major diameter along axis A slightly less than the dimension of the oblong opening 20 in the top flange 10 along that axis, and a minor diameter (along line 3—3 in FIG. 2) perpendicular to axis A which is appreciably greater than the maximum width of the top flange opening 20 between its front and back segments 13 and 14. This is shown most clearly in FIG. 3, which is a cross-section taken along this minor axis. In the case of a top flange 10 intended to fit a 4 inch by 10 inch speaker opening 11 in the car's rear deck, the opening 22 in the bottom flange may be 6 inch by 9 inch ellipse.

Figure 3:
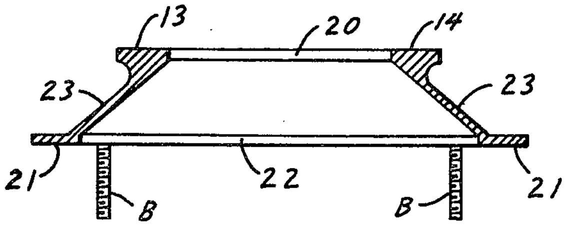
FIG. 3 is a vertical cross-section taken along the line 3—3 in FIG. 2 across the smaller diameter of this adapter.

The top and bottom flanges 10 and 2 are both joined integrally to a tapered, annular sidewall 23 which extends down from the top flange 10 at its opening 20 to the bottom flange 21 at its opening 22. As shown in FIG. 1, this sidewall tapers inwardly and downwardly at the opposite ends of the adapter along the major axis A. As shown in FIG. 3, the sidewall tapers outwardly and downwardly along the minor axis 3—3 in FIG. 2. The sidewall 23 spaces the bottom flange 21 rigidly below the top flange 10 a sufficient distance to locate it far enough below the car's rear deck 12 that there will be enough front-to-back space to accommodate the greater width of the bottom flange 21 along the minor axis 3—3.

A loudspeaker S, with a configuration at its mouth which corresponds to the elliptical opening 22 in the bottom flange 21 of the adapter, may be bolted to the flat bottom face of the bottom flange 21 as shown in FIG. 1. Four bolts B extend down through aligned openings in the bottom flange 21 of the adapter and the top flange F of the speaker, and nuts N are threaded onto these bolts below the speaker's mounting flange F to clamp the speaker rigidly to the bottom flange 21 of the adapter.

I have found that the sound quality of the speaker S is not significantly affected by the fact that the sound it produces is funneled along the inside of the adapter sidewall 23 to the more oblong opening 20 in the top flange 10 of the adapter and the corresponding opening 11 in the car's rear deck 12. Instead the sound quality is determined primarily by the shape of the speaker itself, and experience has shown that, for a given size speaker, the more circular its cross-section the better its sound.

It will be apparent that the present mounting adapter enables the use of a rear speaker of more nearly circular cross-section, and therefore better sound quality, than the speaker opening in the factory-installed rear deck of the car without requiring any modification of that speaker opening or the remainder of the rear deck.

It is to be understood that the speaker opening in the rear deck will be provided with the usual speaker cloth or other sound-permeable protective covering (not shown) for the speaker.

I claim:

1. A mounting adapter for suspending a speaker below a deck having an oblong opening therein, said adapter comprising:

a peripheral top flange for attachment to said deck at said opening therein, said top flange bordering an oblong top opening which corresponds substantially to said deck opening;

a peripheral bottom flange spaced below said top flange and bordering a bottom opening which is appreciably less oblong and more circular than said top opening and said deck opening, said bottom flange being attachable to a speaker having a mouth at its upper end which corresponds substantially to said bottom opening;

and a rigid annular sidewall tapering from said bottom flange around said bottom opening up to said top flange around said top opening for funneling sound coming from the mouth of the speaker to said deck opening.

2. A mounting adapter according to claim 1, wherein said bottom opening is substantially wider than said top opening along an axis perpendicular to the major axis of said top opening.

3. A mounting adapter according to claim 2, wherein said bottom opening is narrower than said top opening along the latter's major axis.

* * * * *